INVENTOR
W. ULRICH
BY John C. Albrecht
ATTORNEY

BEST AVAILABLE COPY

United States Patent Office 3,365,703

Patented Jan. 23, 1968

3,365,703

DATA PROCESSOR WITH SUCCESSIVE UTILIZATIONS OF AN INDEXING RESULT

Werner Ulrich, Colts Neck, N.J., assignor to Bell Telephone Laboratories, Incorporated, New York, N.Y., a corporation of New York Filed Oct. 7, 1964, Ser. No. 402,270
13 Claims. (Cl. 340—172.5)

ABSTRACT OF THE DISCLOSURE

I disclose a stored program data processor with indexing capability in which a match circuit detects the presence, within an instruction word, or bits which signify either that the index adder shall receive no information or that a word shall be written into memory at a location specified by the word itself. When either of these conditions is detected, the normal resetting of the index adder at the start of the execution of the instruction is inhibited and its contents (which was derived during the execution of the previous instruction) is re-employed during the execution of the present instruction. This makes certain fields of the present instruction word, normally used to control the operation of the index adder, available. These fields can now be used to control an additional operation in the data processor, without increasing the time necessary to execute an instruction.

Figure 1:
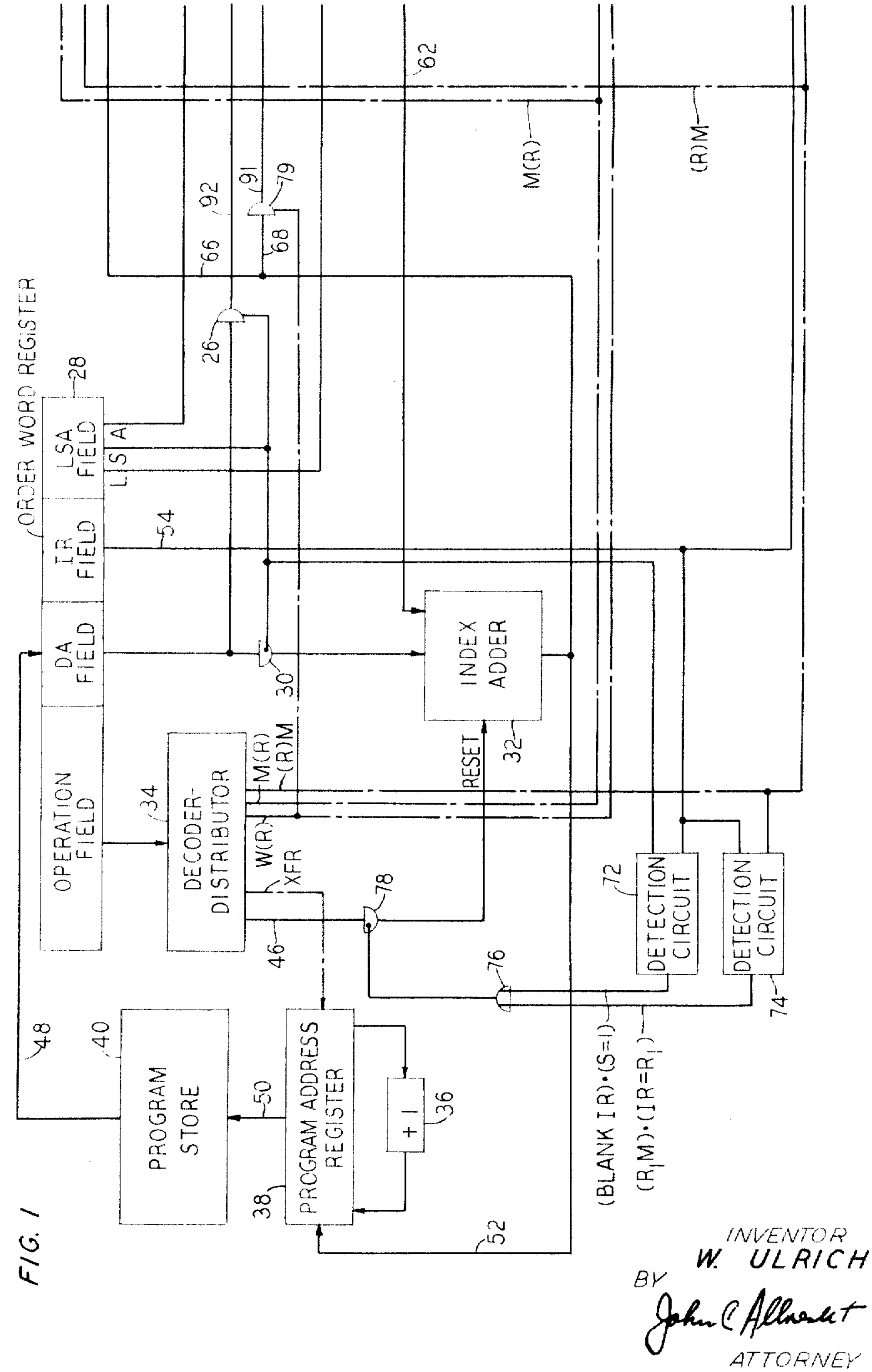

This invention relates to data processors, and more particularly to data processors in which anomalous instruction words are advantageously interpreted to control out of the ordinary machine operation.

The operation of a data processor is generally controlled by a sequence of instruction words. Each of these instruction words may comprise a series of fields, each field representing a different type of information. One of these fields, the operation field, controls the type of order executed by the machine, e.g., read, write, add, etc. Another of these fields is usually a constant. The constant may represent data which is to be written into a specified register or a specified memory location. On the other hand, the constant may represent the address of a location in the memory into which a word in one of the registers is to be written, or from which a word is to be read. Another field in the instruction word may specify one of the registers whose contents are to be used in an indexing operation. Indexing is a step in the execution of an order which controls the modification of the constant in the instruction word by the addition to it of the number stored in the specified index register.

The indexing operation may be understood by considering two examples. Suppose the operation field represents an order to store the constant in the instruction word in a first one of the machine registers. The index register field specifies a second one of the machine registers. In the indexing step the constant in the instruction word is added to the word in the second register, in the index adder. The sum is the word which is stored in the first register. Thus the data in the constant field of the instruction word is modified by the contents of an index register before it is written into another one of the system registers. On the other hand, the constant field in the instruction word might represent an address in the data store. The operation field might specify an order to write the word contained in a first one of the registers into the data store. The index register field specifies a second register. In the indexing step the contents of the second register are added to the address in the constant field of the instruction word. The sum is the effective address of the data store location into which the word in the first register is written. In the second example the constant field represents an address, rather than data, which is modified in accordance with the word stored in the register specified in the index register field of the same instruction word.

An instruction word might also include a fourth field which contains a series of control bits. These bits control operations in the machine in addition to the basic order executed under control of the instruction word. For example, one of the control bits might specify that the contents of a specific register are to be incremented. Another control bit might specify that a masking operation is to be carried out during the execution of the order specified by the operation field. (A masking operation is one in which some of the bits in a word being transferred in the machine are blocked. For example, in a 5-bit machine if the word 11001 is transmitted through the mask 11100, only the three most significant bits 110 pass through the masking circuit. A 0 in a mask blocks the respective bit from passing through the masking circuit. A 1 in the mask allows the respective bit to pass through.) Still another control bit in the control bit field might specify that the constant in the constant field is to be transmitted directly to one of the registers, rather than to be transmitted to the index adder.

While the various fields of an instruction word generally represent different kinds of information, the machine operations controlled by each field must cooperate with each other to produce a meaningful result. Certain combinations of fields however may present what is termed herein an "anomalous" instruction word, an instruction word whose various fields control machine operations which do not cooperate to produce a meaningful result. In ordinary practice these field combinations are therefore not used.

It is a general object of this invention to interpret an anomalous instruction word in such a manner that it controls a total machine operation which is different from the combined operations normally controlled by all of the individual fields, the total operation being one which could not even be controlled by one of the other instruction words.

The anomalous instruction words in the illustrative embodiment of my invention control a variation in the ordinary indexing step in the execution of an order. As will be seen, this variation provides an advantageous machine operation which could not otherwise be obtained. However, the invention is not limited to the control of variations in indexing by anomalous instruction words. My invention in its broader aspects contemplates the control of any part of a data processor by an anomalous instruction word in a manner different from that which would be controlled were the order executed to be merely the sum of the operations represented by the individual fields.

In prior art data processors in which an indexing step is provided, indexing usually takes place whenever a new order is executed. The output of the index adder is either a data word which is written into one of the registers, or it is an address in the data store into which a word is written or from which a word is read. The index adder output is the sum of the constant in the constant field and the word in the register specified in the index register field. It is possible to derive an index adder output which is equal to either one of these quantities. If the index register field is blank the only word which is transmitted to the index adder is the constant in the constant field, and the index adder output is accordingly equal to this number. On the other hand, if the machine has an option permitting the constant field to be transmitted directly to one of the registers rather than to the index adder, under control of one of the bits in the control field, then when this option is used the only word which is transmitted to the index adder is that word stored in the register specified in the index register field. The index adder output is thus equal to the word stored in the specified index register. To execute any order, it is necessary that either the constant field be transmitted to the index adder, or the index register field specify one of the registers, or both. While both fields may control the transmission of a respective word to the index adder, for an order to be executed at least one of these words must be delivered to the index adder. The index adder is reset before a new order is executed, and since the index adder output is either data to be written into one of the registers or the data store, or is the address of a location in the data store into which a word is to be written, or from which a word is to be read, at least one of the constant and index register fields in the instruction word must control the transmission to the index adder of either the constant field or the contents of one of the registers.

It is a more specific object of this invention to use the index adder output, derived during the execution of a first order, as the index adder output for the second order, whereby the constant and index register fields of the second order may control additional operations in the data processor.

The index adder is generally reset before the execution of a new order. In the invention, however, special detecting circuitry is provided for detecting certain combinations in an instruction word, this circuitry then preventing the resetting of the index adder. Accordingly, the index adder output derived during the execution of the previous order is used again during the execution of the present order. The detecting circuitry operates only when predetermined conditions exist in an instruction word.

In the illustrative embodiment of the invention the detection circuitry operates on either one of two conditions. The first of these is when the instruction word being operated upon contains a control bit which directs the constant field directly to one of the registers, and an index register field which is blank. In this situation nothing is transmitted to the index adder and if the index adder is reset, there is no usable effective data or address output. Consequently, the detecting circuitry provided inhibits the index adder from being reset, and the output of the index adder derived during the execution of the previous order is used once again during the execution of the previous order is used once again during the execution of the present order. Where the same index adder output is required in each of two successive orders, an additional operation may be performed during the execution of the second order. By making the index register field blank and controlling the constant field to be directly transmitted to one of the registers, the constant field may be stored in this register while the second order is being executed. Were the special detecting circuitry not provided, it would not be possible to store the constant field in the second instruction directly in one of the registers, since the constant field would be required in the indexing step for the second instruction. A third order would be required to store the required constant in the register.

It will be noted that the special detecting circuitry provided operates when the instruction word presents what would otherwise be an anomalous situation. If the constant field is transmitted directly to one of the registers and the index register field is blank, the instruction word would ordinarily make no sense, for there is nothing from which the index adder output could be derived. This situation is detected and the index adder is inhibited from being reset. The special detecting circuitry, in the illustrative embodiment of the invention, also detects another anomalous situation. One of the operation field codes is (R)M. This code controls the writing of the word contained in the specified register in the data store. The address of the location in the data store into which the word is written is the index adder output, which is the sum of the constant field in the instruction word and the contents of the register specified in the index register field of the instruction word. The anomalous situation is when the register specified in the index register field of the instruction word is the same register which is specified in the (R)M code in the operation field. The BM code, for example, is an indication that the word in the B register is to be written into the data store. A B in the index register field is an indication that this same word in the B register is to determine the location in the data store into which it is to be stored. (The location may be the sum of the constant field and the number in the B register, but the location is still determined by the contents of the B register.) It is the unusual situation in which the word in a register will not only be written into the data store but will also determine the specific location into which it will be written. For this reason when the special detecting circuitry detects a BM code in the operation field of an instruction word and a B in the index register field, the index adder is not reset. The index adder output derived during the execution of the previous order is the address into which the contents of the B register are now written. Since the constant field is no longer required to determine the address, the instruction word may include a control bit which controls the direct transmission of the constant field to one of the registers. In this manner when the second order is executed in addition to the contents of the B register being written into the data store, the instruction word may also control the storing of the constant field in one of the registers. A third order is thus not required to store the word in the constant field in the register because this operation may be controlled during the execution of the second order.

It is a feature of this invention to provide circuitry in a data processor for detecting anomalous combinations of field codes in an instruction word.

It is another feature of this invention to control a total machine operation which is different that the sum of the individual operations which would otherwise be controlled by the field codes of an anomalous instruction word.

It is a feature in the illustrative embodiment of this invention to prevent the resetting of the index adder when the detecting circuitry operates to control the use of the index adder output, derived during the execution of the previous order, during the execution of the present order.

Figure 2:
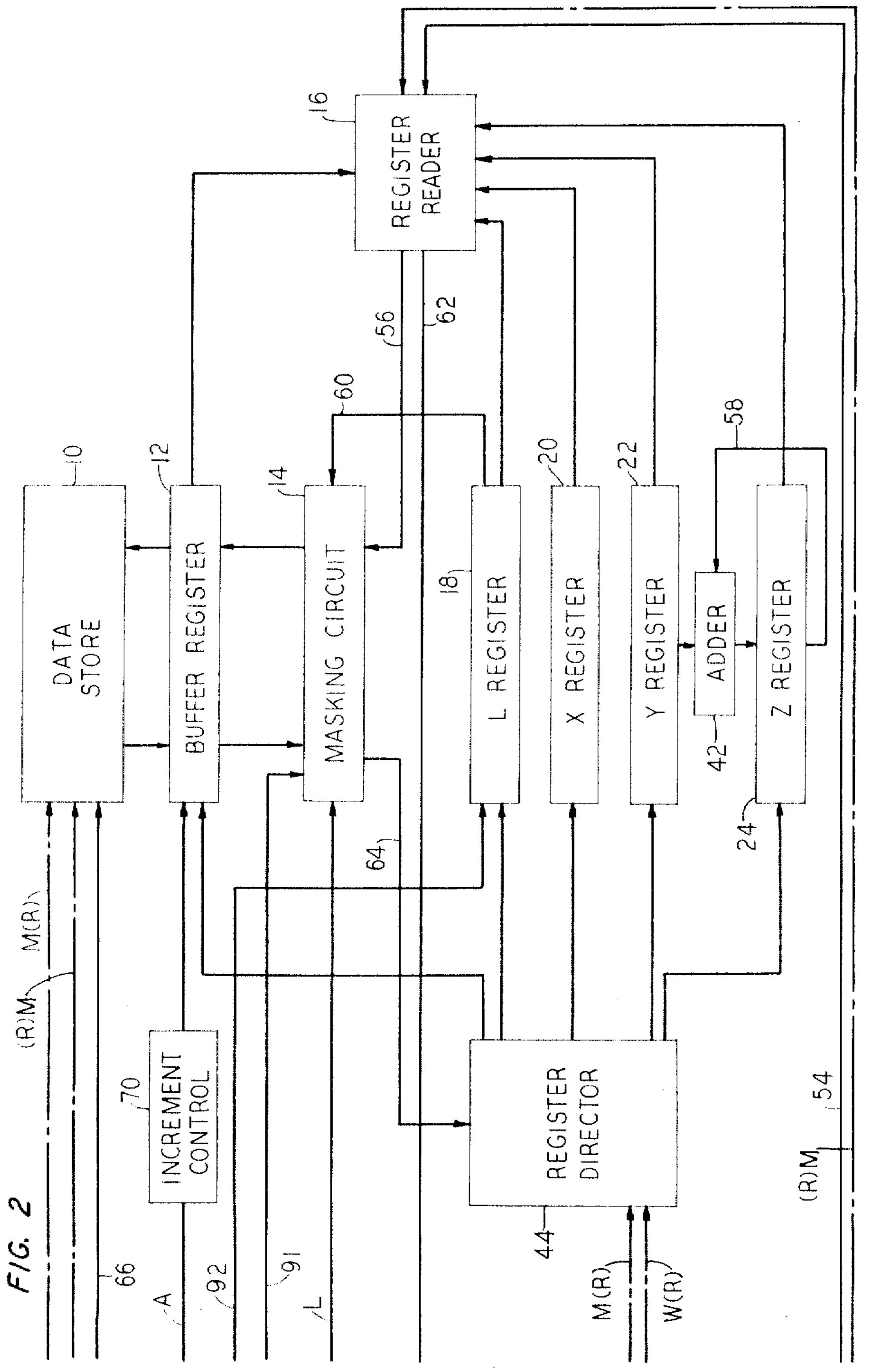

Further objects, features and advantages of the invention will become apparent upon consideration of the following detailed description in conjunction with the drawing in which:

FIGS. 1 and 2 (with FIG. 1 being placed to the left of FIG. 2) are a block diagram schematic of an illustrative data processor incorporating the principles of the invention. Only those parts of the system are shown which are required for an understanding of the present invention. For example, the time of operation of each unit in the system may be controlled, as is well known in the art, by a timing network. This network is not shown in the drawing as it is not necessary for an understanding of the subject invention.

Program store 40 contains a series of instruction words which are transmitted successively over cable 48 to order word register 28. The particular instruction word which is contained in the order word register controls the operation of the various units in the system. The storage address of the instruction which is transmitted to the order word register is contained in program address register 38. The address is transmitted over cable 50 to the program store, the program store in turn fowarding the instruction contained in the particular store location to the order word register. The address in register 38 is continuously incremented by increment circuit 36. Since successively numbered addresses are contained in register 38, successively stored instructions are transmitted to the order word register. It is possible in the system to control the transmission to the order word register of an instruction word not in sequence. An address may be transmitted to program address register 38 over cable 52. If order cable XFR is energized this address is written into the program address register, and the respective instruction is transmitted to the order word register. It is this address which is then incremented to control the transmission to the order word register of instructions stored in successive addresses or locations in the program store.

Each instruction word consists of four parts—operation, DA, IR and LSA fields. The operation field is a code (invariably numerical, as are the other fields) which determines which of the system units operate in executing the order specified by the particular instruction word. Decoder-distributor 34 determines from the operation field code the order which is to be executed. One of four order cables, shown in dotted lines in the drawing, is energized and carries the information required for executing the order to the various system units which require it. Although only four orders may be executed in the system shown it should be noted that the invention is equally applicable to systems in which many more types of operations are provided.

At the same time that the operation field is sent to decoder-distributor 34 the DA field in the instruction word is transmitted through normally enabled gate 30 to index adder 32. The DA field specifies either data or an address. Index adder 32 adds the number contained in the DA field of the instruction word to the contents of one of a series of index registers provided in the system. Register reader 16 reads the contents of buffer register 12, L register 18, X register 20, Y register 22, or Z register 24. A respective cable is connected from each of these five registers to the register reader. The IR field in the instruction word specifies none (if it is blank) or one of these five registers, and the contents of the register specified are transmitted over cable 62 to index adder 32. If no register is specified in the IR field of the instruction word, no bits are transmitted over cable 62 to the index adder. The index adder derives the sum of the numbers contained in the DA field of the instruction word and the specified register. The index adder provides the well-known indexing operation, by which data or an address contained in the DA field of the instruction word is modified by adding to it the contents of one of the registers in the system. The sum at the output of the index adder is transmitted to various units in the system. The only unit which operates on this indexed word is the unit which is enabled by the energized one of the four order cables.

A word may be transmitted to register director 44 from masking circuit 14. The register director operates when either order cable M(R) or W(R) is energized. Information is transmitted to the register director from the decoder-distributor over the energized order cable which identifies either the buffer register, or one of the L, X, Y and Z registers. The input word to the register director is transmitted to the register specified on the order cable over one of five respective register director output cables.

Index adder 32 is not used in the system for adding two data words. The index adder is provided only to modify the DA field of an instruction word in accordance with the contents of one of the system registers. Adder 42 is provided for deriving the sum of two data words. Whenever a new word is written into the Y register by the register director this word is transmitted to adder 42. The Z register is connected to adder 42 by cable 58 for transmitting to the adder the word stored in the Z register. Whenever a new word is written into the Y register the adder adds this word to the word in the Z register and the sum is transmitted to and stored in the Z register. The new word remains in the Y register, and the Z register contains the sum of the new word and the previous contents of the Z register. Thus addition of two data words is accomplished by first controlling the register director to write one of them in the Z register, and then controlling the register director to write the other in the Y register. Whenever the register director writes a word in the Z register adder 42 does not operate. Addition of two data words occurs only when a word is first written in the Y register.

In many data processing machines an insertion mask option is available on various types of orders. The mask word blocks the transmission of selected bits in a word being transferred from one part of the machine to another. For example, in a 6-bit machine the word 101011 might be transferred from a data store to a register. In the course of the transfer the word passes through a masking circuit. Suppose the mask used by the masking circuit is the word 011110. Each bit in the mask is associated with a respective digit in the word. If the mask bit is a 1 the respective digit of the word is allowed to pass through the masking circuit to be written into the register. If the mask bit is a 0 the respective digit in the word is blocked from passing through the masking circuit to the register. Thus, in the example selected, the only digits in the word which are passed through the masking circuit to the register are the four center digits 0101. The two outer digits in the word are blocked. Suppose the register originally contained the word 111000. The four digits coming through the masking circuit are written into the four center stages of the register. The two outer stages of the register are unaffected because no digits are passed through the masking circuit to be written into these stages. Thus, the final word appearing in the register after the masking operation is 101010. The insertion mask option is often highly advantageous because it allows the writing of bits into only a portion of a register or a memory location. (While "insertion" masking is provided in the illustrative embodiment of the invention, the invention is equally applicable to machines which provide product masking. In the latter type of masking operation, the logical product is formed of respective bits in the transferred and mask words, and a complete word is written into the register. In the example selected, the word 001010 would be written in the register. (A specific data processor showing both types of mask options and one in which my invention may advantageously be employed is disclosed in Doblmaier et al. application Ser. No. 334,875, filed Dec. 31, 1963, and such disclosure is hereby incorporated herein.)

Whenever the mask option is required the mask word must first be stored in the L register. The L register is connected by cable 60 to masking circuit 14 and controls the masking of the word transmitted through the masking circuit. The masking circuit is bi-directional. A word transmitted from register reader 16 to the masking circuit over cable 56 may be masked by the mask in the L register before it is stored in buffer register 12. Similarly, the word in the buffer register or on the index adder output cable 68 may be masked in the masking circuit and transmitted over cable 64 to register director 44, from which it is directed to one of the five storage registers in the system. (It may be directed back to the buffer register as well as to one of the other four registers.)

The buffer register itself is a buffer between data store 10 and the rest of the system. The data which is to be operated upon by the data processor is contained in data store 10. An address is transmitted from index adder 32 to data store 10 over cable 66. If a word is to be read out of the data store, order cable M(R) is energized, and the word contained in the specified data store location is transmitted to buffer register 12. When a word is to be written into the data store, order cable (R)M is energized and the word stored in the buffer register is written into the specified data store location. Data store 10 may include input/output equipment of the type described in my copending application Ser. No. 402,090, filed Oct. 7, 1964.

When a word is transmitted from the data store to the buffer register it is automatically transmitted out of the buffer register to the masking circuit. Similarly, when a word is transmitted from the register reader through the masking circuit to the buffer register, the word is automatically transmitted from the buffer register to the data store. In the latter case the word also remains in the buffer register. A word is transmitted from the register reader through the masking circuit to the buffer register when the word in one of the registers is to be written into the data store. It may be desired to operate once again on this word, e.g., by controlling increment control circuit 70 to add a 1 to the word, and for this reason the word also remains stored in the buffer register. However, when a word is read from the data store into the buffer register, it is erased from the buffer register and transmitted through the masking circuit to the register director, from which it is directed to one of the five registers. While passing through the masking circuit it may be masked by the contents of the L register. It may be desired to store the masked word in the buffer register itself. For this reason when a word is first transmitted from the data store to the buffer register and from the buffer register to the masking circuit, the buffer register is reset (all 0's) in order that only the masked word will appear in the buffer register if it is directed to this register by the register director.

Similarly, although the contents of the L, X, Y and Z registers remain unchanged when register reader 16 operates on these registers, the same is not true when the register reader operates on the buffer register. It may be desired to store the word contained in the buffer register in the data store only after it is first masked in the masking circuit. As will be described below this is accomplished by controlling the register reader to read the word in the buffer register and to apply it on cable 56. The word then passes through the masking circuit into the buffer register, and from the buffer register to the data store. When passing through the masking circuit some of the bits in the word may be masked, and were the original word to remain in the buffer register the effect of the masking operation would be nil—the full word would remain in the buffer register. For this reason when register reader 16 reads a word out of the buffer register the buffer register is reset.

The LSA field of the instruction word in the order word register contains three bits of information which control the energization of the three respective L, S and A conductors. The energization of the L conductor controls the operation of masking circuit 14. If the L bit in the instruction word is a 1, masking circuit 14 masks the word transmitted through it by the mask contained in the L register. If the L bit is a 0 the word passing through the masking circuit is not affected by the contents of the L register. When the S bit is a 0 and the respective S conductor is unenergized, gate 30 is enabled and gate 26 is inhibited from operating. The DA field in the order word register is transmitted through gate 30 to index adder 32. When the S bit is a 1 gate 30 is inhibited from operating and gate 26 is enabled. The DA field is transmitted through gate 26 directly to the L register before the order itself is executed. In such a case the output of the index adder is merely the contents of the index register specified in the IR field. The A bit, when a 1, controls increment control circuit 70 to add a 1 to the contents of the buffer register before the order itself is executed. (In other systems it may be desirable to control the incrementing of any of the registers. In the illustrative embodiment of the invention, for the purpose of simplicity, only the buffer register may be incremented.)

Index adder 32 must be reset prior to the execution of any order. The output of the index adder is the sum of the DA field of the previous instruction word and the word stored in the index register specified in the IR field of this previous instruction word. The sum word contained in the index adder must be erased prior to the execution of a new order in order that a new indexed DA word be derived. Decoder-distributor 34 applies a reset pulse to conductor 46 whenever a new instruction word is transmitted to order word register 28. This reset pulse is transmitted through normally enabled gate 78 and resets the index adder in order that the index adder be able to modify the new DA field contained in the order word register.

The operation of the system without the special detecting circuitry of the invention may be best understood by considering on an individual basis the manner in which each of the four types of orders is executed. For the purpose of analyzing an instruction word, all instructions herein have the four fields separated by commas. If any one of the fields is blank, the field in the written instruction is represented by a blank space.

A transfer order is one which controls a transfer to a new instruction out of sequence. A typical instruction might be XFR, 500, Y, 000. Decoder-distributor 34 energizes order cable XFR. This order cable is connected only to program address register 38, and enables a new address appearing on cable 52 to be written into the register. Because the S bit is a 0, gate 26 is inhibited from operating and gate 30 is enabled. Decoder-distributor 34 first transmits a reset pulse on conductor 46 to reset the index adder. The DA field, 500, is then transmitted through gate 30 to the index adder. At the same time the identity of the Y register is transmitted over cable 54 to register reader 16. The register reader reads the contents of the Y register, which may, for example, be the number 25, and transmits this number over cable 62 to the index adder. The index adder modifies the DA field by the contents of the index adder, and the sum 525 appears at the output of the index adder. While this number if transmitted to data store 10 and gate 79, as well as to program address register 38, the data store and gate are not enabled by order cable XFR. The number 525 on cable 52 is written into only program address register 38 because the energized order cable is connected only to this unit. The next instruction transmitted over cable 48 to the order word register is that one stored in the location in the program store whose address is 525. It is this address which is thereafter incremented in the program address register.

When a transfer order is executed the LSA field need not necessarily be 000. If the S bit is a 1 the DA field in the instruction word will not be transmitted to the index adder, and instead will be written directly into the L register. The address of the instruction to which the transfer is effected will thus be the contents of the register specified in the IR field. If such is the case, i.e., the DA field is not required in the execution of the transfer order, the S bit may be made a 1 and the DA field may represent another word which will be required subsequently and which may at this time be written into the L register. The L bit may also be a 1 but even if it is, it has no effect on the system. A word is transmitted through the masking circuit only when register reader 16 operates on an (R)M order, gate 79 is enabled on a W(R) order, or when a word is first written into the buffer register from the data store when an M(R) is executed, the word automatically being transmitted from the buffer register to the masking circuit. When a transfer order is executed no word is transmitted to the masking circuit, and thus even if the L bit is a 1 there is no word which the masking circuit may mask. Finally, the A bit may also be a 1. In addition to the transfer order being executed the contents of the buffer register will be incremented.

It should be noted that register reader 16 applies the contents of the register specified in the IR field to cable 62 for transmission to the index adder. On an (R)M order the register reader also applies a word to cable 56, but this operation is controlled by the (R)M order cable. When a transfer order is executed only order cable XFR is energized, and the register reader only applies the contents of the register specified in the IR field to cable 62. The address in the DA field of the instruction word may be modified by the contents of the specified register, and it is this modified address to which the transfer is effected.

When the word contained in the DA field of an instruction word is to be written into one of the five registers, order cable W(R) is energized. The actual operation field code which appears in the order word register is either WB, WL, WX, WY or WZ. The (R) in the label W(R) indicates that any one of five particular codes may appear in the operation field of the instruction word. The B in the WB code specifies that the DA field is to be written into the buffer register.

When a W(R) order is executed the IR field again specifies that one of the five registers whose contents are to be added to the DA field in the indexing step. The sum word is stored in the register whose identity is contained in the operation field. Register reader 16 reads the word stored in the specified one of registers 12, 18, 20, 22 and 24, and transmits the word over cable 62 to index adder 32. If gate 30 is enabled and the DA field of the instruction word is transmitted through the gate to the index adder, the modified DA field appears at the output of this unit. Program address register 38 and data store 10 are not enabled when a W(R) order is executed. Register director 44 is enabled however by the W(R) order cable, and is notified of the identity of either the buffer register or one of the L, X, Y and Z registers. The modified DA field is transmitted through enabled gate 79 to masking circuit 14, and from the masking circuit to the register director over cable 64. The register director writes the word into one of the five registers in accordance with the particular one of the five W(R) orders being executed.

When a W(R) order is executed the S bit in the LSA field may be a 1. In this case the DA field is transmitted directly to and stored in the L register. The index adder output is merely the contents of the register specified in the IR field. This word is directed to the register specified in the operation field, and consequently by making the S bit a 1 the W(R) order may be used to transfer a word from one register to another. It should be noted that an instruction word may not include both a WL code in the operation field and a 1 in the S bit. If the S bit is a 1 the DA field is stored in the L register. The L in the operation field controls the storage of the word in the register specified by the IR field in the same L register. Thus, when a WL order is executed the S bit must be a 0. The DA field must be transmitted to the index adder through gate 30. If it is desired merely to transfer a word from one register to the L register the DA field may contain all 0's in order that the sum derived in the index adder be equal to the contents of the register specified in the IR field.

If the L bit is a 1 the index adder output is masked during the execution of the order. The A bit may also be a 1. If it is, it merely controls the incrementing of the word in the buffer register prior to the execution of the order. If a W order is executed however even if the A bit is a 1 it has no effect on the system. The contents of the buffer register are incremented, but immediately thereafter the register director writes the transferred word into the buffer register and the original incremented word is erased. For this reason the A bit should be a 0 whenever a W order is executed.

The third type of order controls the reading of a word in the data store and its writing into one of the five registers. The M(R) order cable is energized whenever an MB, ML, MX, MY or MZ order is executed. The second letter in the operation field of the instruction word represents the register into which the data or memory store word is to be written. The register identify is transmitted along the order cable to register director 44.

When an M(R) order is executed if the S bit in the LSA field is a 0 the DA field of the instruction word is transmitted through gate 30 to the index adder. The IR field represents that one of the five registers whose contents are to be transmitted to the index adder to be used in the indexing step. As in the execution of XFR and W(R) orders, after the index adder is reset the DA field is added in the index adder to the contents of the register specified in the IR field. The sum is transmitted to data store 10 over cable 66 and represents the address in the data store whose contents are to be transmitted to buffer register 12. The word is then automatically transmitted from the buffer register (which is then reset) through the masking circuit to register director 44. The word is masked by the contents of the L register only if the L bit in the LSA field of the instruction word is a 1. The masked word on cable 64 is then directed by register director 44 to that one of the five registers identified in the operation field. It should be noted that the index adder output on cable 68 is transmitted to gate 79 as well as to the data store. However, when an M(R) order is executed gate 79 is not enabled.

If the S bit is a 1 gate 30 is inhibted from operating and gate 26 is enabled. In this case the output of the index adder, the address in the data store whose word is to be read, is merely the number contained in the index register specified in the IR field. The DA field instead of being transmitted to the index adder is transmitted through gate 26 to the L register. The DA field thus becomes the mask which is used in the subsequent masking operation if the L bit is a 1. Even if the L bit is a 0 and the masking operation is not required, the DA field may be written into the L register in this manner for subsequent use in the system. The combination of gates 26 and 30, controlled by the S bit in the LSA field, is highly advantageous because if the address of the word to be read out of the data store is already contained in one of the index registers (the buffer, X, Y, and Z registers), the DA field in the instruction word may be used to carry the mask required for the mask option. The S bit is a 1 to direct the DA field directly to the L register. The L bit is a 1 to control the masking operation.

When an M(R) order is executed the A bit may be a 1, but even if it is, it has no effect on the system. If it is a 1, before the order is executed the contents of the buffer register are incremented. However, the word in the buffer register is erased when the new word from the data store is first placed in the buffer register. For this reason there is no reason to increment the original contents of the buffer register in the first place, and on an M(R) order the A bit should be a 0.

The fourth type of order which may be executed is an (R)M order which controls the storage of the word in a specified one of the five registers in the data store. Suppose the order ZM, 500, Y, 100 is executed, and the contents of the Y register are 25. Because the S bit is a 0 the DA field, 500, is transmitted to the index adder. At the same time register reader 16 delivers the contents of the Y register to the index adder over cable 62. The sum derived by the index adder, 525, is transmitted over cable 66 to data store 10. The (R)M order cable is energized and notifies the data store that the number 525 is the address of the location into which the word next to be written in the buffer register is to be stored. The ZM code in the operation field controls the transmission over the (R)M order cable to register reader 16 of a command to read the contents of the Z register and to apply the data word to cable 56. The register reader operates twice in succession, first in response to the Y code in the IR field, and then in response to the Z code in the operation field, with the contents of the Y register being applied to cable 62 and the contents of the Z register being applied to cable 56. The word in the Z register is transmitted through masking circuit 14 to buffer register 12, and because the L bit is a 1 it is masked by the contents of the L register. The masked word is then inserted into the buffer register; the buffer register word is then written into the location in the data store whose address is 525.

If the address 525 is already contained in the Y register, rather than the address 500, the mask to be used in executing the order may be carried in the DA field of the instruction word, rather than using a previous instruction to store the mask in the L register. The S bit would in this case be a 1. Gate 30 would be inhibited from operating and the contents of the Y register would be transmitted to the index adder, and from the index adder to the data store. The DA field would be written directly into the L register, and the masking, if required, would be controlled by a 1 in the L bit of the LSA field.

A primary purpose of the invention is to enable the system to accomplish with two instructions what would otherwise require three. For this reason it is appropriate at this point to examine two three-instruction sequences which would be required in the system to carry out two respective sequences of operations were it not for the inclusion of match circuits 72 and 74, and gates 76 and 78. For purposes of explanation it will be assumed that each of the registers and data store locations has nine digits, each for representing one of the binary values. All numbers are written, however, in the octal code; thus the mask 000111111 is represented by 077. (The LSA field is written in binary code in all instructions.) As a first example consider that the X register contains the number 700, location 710 in the data store contains the number 362, the Z register contains the number 530, and it is necessary to substitute the two least significant digits in the Z register in location 710, i.e., the number 330 is to be stored in location 710. The following three instructions, in sequence, control the execution of the required operation:

MB, 10, X, 000
WL, 007, —, 000
ZM, 10, X, 100

When the first order is executed the register reader controls the transmission of the number 700, contained in the X register, to the index adder. Because the S bit is a 0 gate 30 is enabled rather than gate 26, and the DA field, 10, is also transmitted to the index adder. The sum 710 is transmitted over cable 66 to the data store. The energization of order cable M(R) controls data store 10 to deliver the contents of location 710 to buffer register 12. The number 362 is then automatically transmitted through the masking circuit to the register director. The L bit is a 0 and the number 362 appears on cable 64 because masking does not take place. The MB code in the operation field controls register director 44 to direct the number back to the buffer register. (It should be noted that in executing this particular order there is no reason to first transmit the number stored in the buffer register to the register director, and to then direct it back to the buffer register. However, when the word read from the data store is to be directed to one of the other registers the word first stored in the buffer register must be transmitted to the register director, e.g., when an MX order is executed. Rather than to provide additional circuitry for inhibiting the transmission of the word first written into the buffer register when an MB order is executed, the word transmitted to the register director is merely transmitted back to the buffer register. Also, this sequence allows the word read to be masked before it is finally stored in the buffer register, if masking is required. Here, it is not, and the L bit is a 0.) The net effect of the first order is that the number 362 appears in the buffer register.

When the next order is executed, because the S bit is a 0 the DA field, 077, is directed to the index adder. The IR field is blank and register reader 16 does not operate. Decoder-distributor 34 first resets the index adder. Since only the DA field is transmitted to the index adder the output of the index adder is merely the number 077. This number is delivered over cable 68 to the masking circuit. The L bit in the LSA field is a 0 so no masking takes place. The L in the operation field controls register director 44 to direct the number 077 to the L register. The net effect of the second order is that the mask 077 is stored in the L register.

Alternatively, the second order may contain a 1 in the S bit. In this case, the DA field, 077, would be transmitted directly through gate 26 to the L register. In this case, additional operations may be performed, if desired. For example, the operation field may be WY, and the IR field may specify the Z register, in which case the contents of the Z register may be stored in the Y register, in addition to the storage of the mask in the L register. The operation field may even be other than the form W(R). For example, if it is MZ, the number in the location of the data store whose address is contained in the register specified by the IR field would be transmitted to the Z register. If the order is of the form (R)M the number in the specified register would be transmitted to and stored in this same location of the data store. Finally, at the same time that the mask is stored in the L register it is even possible to control a transfer operation. If the operation field is XFR the address in the register specified by the IR field is stored in the program address register at the same time that the mask is transmitted to the L register. In this latter case however the third instruction in the sequence must be contained in this particular address of the program store.

When the third order is executed the indexing operation is the same as that performed when the first order is executed. The index adder is first reset. The DA field, 10, appears at one output of the index adder, and the number 700, in the X register, is transmitted by the register reader to the other input of the index adder. The sum, 710, is transmitted over cable 66 to data store 10. Register reader 16 then operates a second time under the control the order cable (R)M. Because the code Z is contained in the operation field, register reader 16 applies the contents of the Z register, 530, to cable 56. This number is transmitted through the masking circuit, and because the L bit is a 1 is masked by the mask contained in the L register. Only the two least significant digits, 30, are sent from the masking circuit to the buffer register. The buffer register originally contains the number 362, and after the number 30 is substituted for the two least significant digits in the buffer register, the buffer register contains the desired number 330. The energization of order cable (R)M notifies data store 10 to write the number 330 contained in the buffer register into location 710, which address is transmitted over cable 66 to the data store. The net effect of the third order is that the number 330 is stored in location 710 of the data store as required.

Consider next the following example. The number 362 is contained in location 710 of the data store. The X register contains the number 700, and the object of the three-instruction sequence is to increment the units digits of the number stored in location 710 by 1 and to erase the hundreds digit, i.e., the number 63 is to be stored in location 710. The following three orders accomplish the desired objective.

MB, 10, X, 000
WL, 077, —, 000
BM, 10, X, 101

When the first order is executed because the S bit is a 0 the contents of the DA field, 10, are transmitted to the index adder, as are the contents of the X register, 700, identified in the IR field. Decoder-distributor 34 first resets the index adder and the adder then derives the sum 710. The address 710 is transmitted over cable 66 to data store 10. Order cable M(R) is energized and controls the data store to read out the contents of location 710 into buffer register 12. As usual when a word is first read into the buffer register from the data store it is transmitted through masking circuit 14 to register director 44. The L bit in the LSA field is a 0 and the number 362 is not masked by the contents of the L register on its way to the register director. The B in the operation field of the instruction word controls register director 44 to direct the number 362 on cable 64 back to the buffer register. The net effect of the first instruction is that the number 362 is stored in the buffer register.

The second instruction merely controls the storage of the mask 077 in the L register. The same remarks apply to the second instruction in the subject sequence as those above regarding the second instruction in the first sequence considered. A variety of orders may be given for the second in the sequence, some of which will control operations in addition to the storage of the mask in the L register. The first two instructions in the present sequence are identical to the first two instructions in the previously considered sequence.

The A bit in the third instruction is a 1. Consequently, before any other steps are carried out in the execution of the third order increment circuit 70 increments the contents of the buffer register 12 by 1. The S bit in the LSA field is a 0, and the DA field, 10, is thus directed to the index adder. The X in the IR field controls the transmission of the number 700 in the X register to the index adder. The index adder is first reset and thereafter derives the sum 710 which is directed over cable 66 to data store 10. The B in the operation field controls register reader 16 to read out the contents of the buffer register, 363, and apply this number to cable 56. As usual when a number is read out of the buffer register the buffer register is reset to 000. The number 363 on cable 56 passes through the masking circuit and because the L bit is a 1 it is masked by the contents of the L register. Consequently the only octal digits which are written into the buffer register are the two least significant digits 63. Whenever a number is written into the buffer register on an (R)M order the contents of the buffer register are directed to the data store. The number 63 in the buffer register is thus directed to the data store and stored in location 710.

The purpose of detection circuits 72 and 74, and gates 76 and 78 is to prevent the reset pulse on conductor 46 from resetting the index adder when either one of two special conditions are detected by detection circuits 72 and 74. Three inputs are provided to the detection circuits. The first is an input from order cable (R)M, extended to circuit 74. The second is an input to both circuits from cable 54 which carries the identity of the register specified by the IR field. The third is an input to circuit 72 which is the value of the S bit in the LSA field. Detection circuits 72 and 74 each controls OR gate 76, which in turn controls gate 78 to inhibit the transmission of the reset pulse to the index adder. Detection circuit 72 operates when the IR field is blank and the S bit is a 1, no matter what type of order is being executed. Detection circuit 74 operates if an (R)M order is being executed and the register ($R_1$) specified in the operation code field is the same as that in the IR field. The purpose for preventing the resetting of the index adder when either one of these two conditions exists is to maintain at the output of the index adder the same number derived during the indexing operation of the previous instruction. The same index adder output is utilized during the execution of the present order. The common characteristic of the two conditions for which detection circuits 72 and 74 operate is that each condition presents an otherwise anomalous situation. Consider the first in which the IR field is blank and the S bit contains a 1. Because the IR field is blank, register reader 16 does not operate and does not transmit the contents of one of the registers to the index adder. Because the S bit is a 1 the DA field is transmitted directly to the L register, rather than to the index adder. An index adder output is required when almost all orders are executed, and if the index adder is reset there is no usable output (other than 000 which only infrequently would be required). For this reason the index adder is not reset and the output derived from the execution of the previous order is utilized in the execution of the present order. The second condition is also highly unusual. For example, the existence of a Z in the ZM operation field is an indication that the contents of the Z register (either with or without masking) are to be written into the data store. A Z in the IR field is an indication that the location in the data store into which the word is to be written is represented by the contents of the Z register (either modified or not in accordance with the DA field). The contents of the Z register thus determines not only the number to be written into the data store, but also the location into which this number is to be written. This is a highly unusual situation, and rather than to perform a new indexing operation the previously derived index adder output is maintained and used in the execution of the present order. As will now be seen because an indexing operation is not required whenever an instruction word exhibits one of the two special conditions for which detection circuit 72 or 74 operates, additional information may be carried in an instruction word. More specifically, the operation controlled by each of the three-instruction sequences above may now be accomplished with the execution of only two orders.

Consider the first example described above. Location 710 in the data store contains the number 362. The Z register contains the number 530, and the X register contains the number 700. The objective is to store the number 330 in location 710. The following two instructions are the only ones required:

MB, 10, X, 000
ZM, 077, —, 110

The first order is identical to the first in the three-instruction sequence above. The number 362 is read out of the data store into the buffer register. In the three-instruction sequence the second instruction controls the storage of the mask 077 in the L register. The third controls the reading of the number in the Z register, after masking, into the buffer register, and then storing the contents of the buffer register into the data store. Both of these operations are carried out by the single last instruction in the couplet under consideration. Because the S bit is a 1 the DA field, 077, is first directed straight to the L register. Because the IR field is blank and the S bit is a 1, match circuit 72 operates and prevents the resetting of the index adder. The output of the index adder, 710, which was derived when the first order was executed remains on cable 66, connected to the data store. The Z in the operation field controls register reader 16 to apply the contents of the Z register, 530, on cable 62. Because the L bit is a 1 this number is masked by the mask just stored in the L register, and only the two least significant digits 30 are stored in the buffer register. The contents of the buffer register, 330, are then stored in location 710 of the data store. The reason that the second order accomplishes what previously took two orders is that a separate order is no longer required to store the mask in the L register. Because indexing is not required on the second order, since the indexed quantity required is identical to that derived in the execution of the previous order, the DA field is not required to carry the number 10 to be used in deriving a data store address. Instead, the DA field may be used to carry the mask, and the S bit which is a 1 controls the writing of the mask into the L register, which operation previously required a separate order.

Consider next the second three-instruction sequence considered above. Location 710 contains the number 362, and the X register contains the number 700. The number 63 is to be substituted for the number 362. This is accomplished by the following couplet of instructions:

MB, 10, X, 000
BM, 077, B, 111

The first instruction is the same as that in the three-instruction sequence and merely controls the storage of

BEST AVAILABLE COPY the number 362 in the buffer register. The second instruction in the three-instruction sequence controlled the storage of the mask in the L register, and the third controlled the incrementing of the contents of the buffer register, the masking of this number, and its storage in the data store. All of these operations are now controlled by the second order in the couplet. Because the S bit is a 1 the DA field, 077, is directly stored in the L register. Because the A bit is also a 1 the contents of the buffer register are first incremented by 1. The B in the operation field controls register reader 16 to read the contents of the buffer register, 363, and apply this number to cable 56. The 1 in the L bit of the LSA field controls the masking of this number by the mask in the L register. The number 63 is thus stored in the buffer register. This number is written into the data store in the location whose address is represented by the output of the index adder. This address, 710, was derived during the execution of the first order. The index adder is not reset because the second condition, the same register being specified in the operation and IR fields, exists. The index adder output previously derived is utilized in the execution of the second order. While the B in the index register field controls the transmission to the index adder of the contents of the buffer register, because the index adder is not reset its output remains unaffected. Because indexing is not required in the execution of the second order the DA field in the second instruction word may represent the mask which is stored directly in the L register. A separate order is thus not required for writing the mask into the L register, and a couplet of instructions may accomplish what would otherwise require the execution of three orders. The B in the IR field of the second instruction, since indexing is not required, serves no purpose other than to control the operation of detection circuit 74.

In the instruction sequence just described the B register was specified in both the operation and IR fields of the second instruction word. Another one of the registers may be specified however. For example, consider the following objective: The word in location 715 of the data store is to be transferred to the Z register. The contents of the Y register are to be masked by the word already in the L register and stored in the same location 715. The buffer register contains the number 700. The first instruction might be MZ, 15, B, 000. Because the S bit is a 0 the DA field, 15, is transmitted to the index adder. The buffer register is specified in the IR field and the number 700 is also transmitted to the index adder. The sum 715 is transmitted to the data store and the contents of this location are delivered to the buffer register. The word is then transmitted through the masking circuit, without being masked because the L bit is a 0, and the register director writes the word into the Z register.

The next instruction must control the writing of the contents of the Y register into location 715 of the data store. Before the first instruction is executed the number 700 is contained in the buffer register. This number is destroyed however during the execution of the first order. The next order, whose operation field code is YM, may include the number 715 in the DA field and a blank IR field. The index adder output will thus be 715, the required write address. Since masking is required the L bit is a 1, and the complete instruction might be YM, 715, —, 100. However, another instruction may be used as the second in the sequence, namely, YM, —, Y, 100. Because the Y register is specified in both the operation code and IR fields, detection circuit 74 operates and prevents the index adder from being reset. The previously derived index adder output, 715, is utilized as the write address during the execution of the order. The second instruction in the sequence, which makes use of detection circuit 74, may often be more advantageous than the one previously described in which the DA field is 715. The same subroutine may be used whenever a word is to be read from one data store location into the Z register, and a word in the Y register is to be written into the same location. It is only necessary that the buffer register first contain the desired address less 15. For example, if the address of interest is 315 it is only necessary to first place the number 300 in the buffer register and to then use the two-instruction sequence, the second instruction of which controls the operation of detection circuit 74. (It should be noted that in the sequence just considered it is not possible to use an instruction which exhibits the anomalous condition of the blank IR field and a 1 in the S bit. The second instruction in the sequence must include a 0 in the S bit because the mask to be used in the execution of the YM order is the one already contained in the L register. The S bit must be a 0 in order that the DA field not be transmitted to the L register and destroy the mask.)

The detection circuits in the illustrative embodiment of the invention detect only two anomalous conditions in an instruction word. It will be apparent however that similar circuits may be provided to detect other conditions for which the index adder is not to be reset. For example, another circuit may be provided to detect a condition in which the same register is specified in the M(R) operation code field and the IR field. In such a situation the word read from the data store would come from the location whose address was derived during the indexing step of the previous order.

Thus in accordance with aspects of my invention certain otherwise highly irregular instruction words may be interpreted to control the prevention of the resetting of the index adder. Consequently the index adder output derived during the execution of a first order may be used during the execution of a subsequent order. Since indexing is not required during the execution of this subsequent order additional information may be carried in the instruction word for controlling an operation which would otherwise require the execution of a separate order. The use of the principles of the invention does more than merely prevent an anomalous machine operation; an otherwise unobtainable desirable result is achieved. For example, as seen above a two-instruction sequence can accomplish what would otherwise require three instructions.

In many systems an interrupt feature is provided. A sequence or subroutine may be interrupted when a certain condition is detected, and a transfer to another subroutine with a higher priority may be controlled. After this subroutine is completed a transfer is made back to the original subroutine. In the illustrative embodiment of the invention no interruptions may be allowed between the executions of the first and second orders in either couplet. The index adder output, derived when the first order is executed, is required during the execution of the second order, and if another subroutine is executed between the two orders the required index adder output will not be present when a transfer back to the second order in the couplet finally takes place. For this reason, in those machines where interrupt sequences are provided the first instruction in each couplet must notify the system not to interrupt until the next order in the sequence is executed.

It is to be understood that the above-described arrangement is merely illustrative of the principles of the invention. Numerous modifications may be made therein and other arrangements may be devised without departing from the spirit and scope of the invention.

What is claimed is:

1. A data processor comprising a data word store, a plurality of index registers, an instruction word register, means for successively transmitting instruction words to said instruction word register, each of said instruction words including operation, data-address, index register and control bit fields, an index adder, means responsive to the control bit field in said instruction word register for selectively transmitting the data-address field in said instruction word register to said index adder and to a predetermined one of said index registers, means responsive to the representation of one of said index registers in the index register field in said instruction word register for transmitting the data word in said one index register to said index adder and responsive to none of said index registers being represented in said index register field for remaining inoperative, said index adder deriving the sum word of the data-address field and the index register data word transmitted thereto, means responsive to an instruction word being transmitted to said instruction word register for resetting said index adder, means responsive to a first type of operation field being contained in said instruction word register for storing said index adder sum word in a selected index register, means responsive to a second type of operation field being contained in said instruction word register for writing the data word in a selected index register in said data word store at an address determined by said index adder sum word, means responsive to a third type of operation field being contained in said instruction word register for reading the data word stored in said data word store at the address specified by said index adder sum word into a selected index register, a first match circuit operative in response to an instruction word contained in said instruction word register having no index register represented in the index register field and a control bit field which controls the transmission of the data-address field to said predetermined index register rather than to said index adder, a second match circuit operative in response to an instruction word contained in said instruction word register having said second type of operation field with the selected index register being the same as the index register represented in the index register field, and means responsive to the operation of either of said first and second match circuits for inhibiting the operation of said index adder resetting means.

2. A data processor in accordance with claim 1 further including a masking circuit, means for transmitting said index adder sum word through said masking circuit before it is stored in said selected index register when said first type of operation field is contained in said instruction word register, for transmitting said index register data word through said masking circuit before it is written into said data word store when said second type of operation field is contained in said instruction word register, and for transmitting said data store word through said masking circuit before it is stored in said selected index register when said third type of operation field is contained in said instruction word register, and means responsive to the control bit field in said instruction word register for controlling said masking circuit to mask the word transmitted through it in accordance with the data word contained in said predetermined register.

3. A data processor comprising a data word store, a plurality of index registers, an instruction word register, means for successively transmitting instruction words to said instruction word register, each of said instruction words including operation, data-address, index register and control bit fields, an index adder, means responsive to the control bit field in said instruction word register for selectively transmitting the data-address field in said instruction word register to said index adder and to a predetermined one of said index registers, means responsive to the representation of one of said index registers in the index register field in said instruction word register for transmitting the data word in said one index register to said index adder and responsive to none of said index registers being represented in said index register field for remaining inoperative, said index adder deriving the sum word of the data-address field and the index register data word transmitted thereto, means responsive to an instruction word being transmitted to said instruction word register for resetting said index adder, means responsive to the operation field contained in said instruction word register for transferring a data word between a selected one of said index registers and said data word store in accordance with said sum word derived by said index adder, a first match circuit operative in responsive to an instruction word contained in said instruction word register having no index register represented in the index register field and a control bit field which controls the transmission of the data-address field to said predetermined index register rather than to said index adder, a second match circuit operative in responsive to the operation field of the instruction word contained in said instruction word register identifying a selected index register which is the same as the index register represented in the index register field, and means responsive to the operation of either of said first and second match circuits for inhibiting the operation of said index adder resetting means.

4. A data processor comprising a data store, a plurality of index registers, an instruction word register, means for successively transmitting instruction words to said instruction word register, each of said instruction words including a code field and a constant field, an index adder, means responsive to the code field in said instruction word register for selectively transmitting the constant field in said instruction word register to said index adder, means responsive to the code field in said instruction word register for selectively transmitting the data in one of said index registers to said index adder, said index adder deriving the sum of the constant field and the index register data transmitted thereto, means responsive to an instruction word being transmitted to said instruction word register for resetting said index adder, means responsive to the code field in said instruction word register for transferring data between said index registers and said data store in accordance with the sum derived by said index adder, a first match circuit operative in response to the code field in said instruction word register controlling the transmission to said index adder of neither the data in one of said index registers nor the constant field in said instruction word register, a second match circuit operative in response to the code field in said instruction word register controlling both the transmission to said index adder of data in one of said index registers and the transfer of the same data from said index register, and means responsive to the operation of either of said first and second match circuits for inhibiting the operation of said index adder resetting means.

BEST AVAILABLE COPY

5. A data processor comprising
a data store,
a plurality of index registers,
an instruction word register,
means for successively transmitting instruction words to said instruction word register, each of said instruction words including a code field and a constant field,
an index adder,
means responsive to the code field in said instruction word register for selectively transmitting the constant field in said instruction word register to said index adder,
means responsive to the code field in said instruction word register for selectively transmitting the data in one of said index registers to said index adder,
said index adder deriving the sum of the constant field and the index register data transmitted thereto,
means responsive to an instruction word being transmitted to said instruction word register for resetting said index adder,
means responsive to the code field in said instruction word register for transferring data between said index registers and said data store in accordance with the sum derived by said index adder,
a match circuit operative in responsive to the code field in said instruction word register controlling the transmission to said index adder of neither the data in one of said index registers nor the constant field in said instruction word register,
and means responsive to the operation of said match circuit for inhibiting the operation of said index adder resetting means.

6. A data processor comprising
a data store,
a plurality of index registers,
an instruction word register,
means for successively transmitting instruction words to said instruction word register, each of said instruction words including a code field and a constant field,
an index adder,
means responsive to the code field in said instruction word register for selectively transmitting the constant field in said instruction word register to said index adder,
means responsive to the code field in said instruction word register for selectively transmitting the data in one of said index registers to said index adder,
said index adder deriving the sum of the constant field and the index register data transmitted thereto,
means responsive to an instruction word being transmitted to said instruction word register for resetting said index adder,
means responsive to the code field in said instruction word register for transferring data between said index registers and said data store in accordance with the sum derived by said index adder,
a match circuit operative in response to the code field in said instruction word register controlling both the transmission to said index adder of data in one of said index registers and the transfer of the same data from said one index register,
and means responsive to the operation of said match circuit for inhibiting the operation of said index adder resetting means.

7. A data processor comprising
a data store,
a plurality of index registers,
an instruction word register,
means for successively transmitting instruction words to said instruction word register, each of said instruction words including a code field and a constant field,
an index adder,
means responsive to the code field in said instruction word register for selectively transmitting the constant field in said instruction word register to said index adder,
means responsive to the code field in said instruction word register for selectively transmitting the data in one of said index registers to said index adder,
said index adder deriving the sum of the constant field and the index register data transmitted thereto,
means responsive to the code field in said instruction word register for transferring data between said index registers and said data store in accordance with the sum derived by said index adder,
a match circuit operative in response to the code field in said instruction word register specifying the transmission to said index adder of neither the data in one of said index registers nor the constant field in said instruction word register,
and means responsive to the operation of said match circuit for controlling the operation of said transferring means in accordance with the sum derived by said index adder during its operation responsive to a prior instruction word having appeared in said instruction word register.

8. A data processor comprising
a data store,
a plurality of index registers,
an instruction word register,
means for successively transmitting instruction words to said instruction word register, each of said instruction words including a code field and a constant field,
an index adder,
means responsive to the code field in said instruction word register for selectively transmitting the constant field in said instruction word register to said index adder,
means responsive to the code field in said instruction word register for selectively transmitting the data in one of said index registers to said index adder,
said index adder deriving the sum of the constant field and the index register data transmitted thereto,
means responsive to the code field in said instruction word register for transferring data between said index registers and said data store in accordance with the sum derived by said index adder,
a match circuit operative in response to the code field in said instruction word register controlling both the transmission to said index adder of data in one of said index registers and the transfer of the same data from said one index register,
and means responsive to the operation of said match circuit for controlling the operation of said transferring means in accordance with the sum derived by said index adder during its operation responsive to a prior instruction word having appeared in said instruction word register.

9. A data processor comprising
a data store,
a plurality of index registers,
an instruction word register,
means for successively transmitting instruction words to said instruction word register, each of said instruction words including a code field and a constant field,
an index adder,
means responsive to the code field in said instruction word register for selectively transmitting the constant field in said instruction word register to said index adder,
means responsive to the code field in said instruction word register for selectively transmitting the data in one of said index registers to said index adder,
said index adder deriving the sum of the constant field and the index register data transmitted thereto,
means responsive to the code field in said instruction word register for transferring data within said data processor in accordance with the sum derived by said index adder, means operative responsive to the code field in said instruction word register representing an order for said index adder to derive a sum which would control an anomalous operation of said transferring means, and means responsive to the operation of said last-mentioned means for controlling the operation of said transferring means in accordance with the sum derived by said index adder during its operation responsive to a prior instruction word having appeared in said instruction word register.

10. A data processor comprising a data word store, a plurality of registers, an instruction word register, means for successively transmitting instruction words to said instruction word register, an index adder, means responsive to the instruction word contained in said instruction word register for selectively transmitting to said index adder a portion of said instruction word and the data word stored in one of said registers, said index adder deriving the sum of the words transmitted thereto, means responsive to the instruction word contained in said instruction word register for transferring data words within said data processor in accordance with the sum derived by said index adder, means operative responsive to the instruction word contained in said instruction word register representing an order for said index adder to derive a sum which would control an anomalous operation of said transferring means, and means responsive to the operation of said last-mentioned means for controlling the operation of said transferring means in accordance with the sum derived by said index adder during its operation responsive to a prior instruction word having appeared in said instruction word register.

11. A data processor comprising an index adder; a plurality of index registers; a data store; a masking circuit; an instruction word register for representing four parts of an instruction word, an operation code field, a data-address field, an index register field, and a control bit field; means responsive to said control bit field for transmitting said data-address field to said index adder and to a predetermined one of said index registers; means for transmitting the data in the index register specified by said index register field to said index adder, said index adder deriving the sum of said data-address field and said index register data; means responsive to said operation code field for transferring data within said data processor between said index registers and said data store in accordance with said sum derived by said index adder; means responsive to said control bit field for masking said transferred data in accordance with the data contained in said predetermined index register; and means for resetting said index adder whenever a new instruction word appears in said instruction word register; characterized by first means for detecting in an instruction word in said instruction word register a blank index register field and a control bit field which controls said transmitting means to transmit said data-address field to said predetermined index register; second means for detecting in an instruction word in said instruction word register the identity of the same index register in both said operation code and said index register fields; and means responsive to said first and second detecting means for inhibiting the operation of said resetting means.

12. A data processor comprising a data store, a plurality of index registers, an instruction word register containing an instruction word including operation code, data-address, and index register fields, an index adder, means responsive to said instruction word for selectively transmitting to said index adder said data-address field and the data contained in the index register whose identity is represented in said index register field, said index adder deriving the sum of the data-address field and the index register data transmitted thereto, means for selectively transmitting instruction words to said instruction word register and for resetting said index adder when an instruction word is first transmitted to said instruction word register, means responsive to the operation code field contained in said instruction word register for storing the data in a selected index register in said data store at a location represented by the sum last derived by said index adder, and means for inhibiting the resetting of said index adder when said selected index register is the same as the index register whose identity is represented in said index register field in said instruction word register.

13. A data processor comprising a data store, a plurality of index registers, an instruction word register containing an instruction word including operation code, data-address, and index register fields, an index adder, first means responsive to said instruction word for selectively transmitting to said index adder said data-address field and the data contained in the index register whose identity is represented in said index register field, said index adder deriving the sum of the data-address field and the index register data transmitted thereto, second means for selectively transmitting instruction words to said instruction word register and for resetting said index adder when an instruction word is first transmitted to said instruction word register, means for transferring data within said data processor in accordance with the operation code field contained in said instruction word register and in accordance with the sum last derived by said index adder, and means for inhibiting the resetting of said index adder when said first transmitting means transmits to said index adder neither the data-address field contained in said instruction word register nor the data in one of said index registers.

References Cited

UNITED STATES PATENTS 3,275,989 9/1966 Glaser et al. ------ 340—172.5

ROBERT C. BAILEY, *Primary Examiner.*

J. P. VANDENBURG, *Assistant Examiner.*